Figure 2:
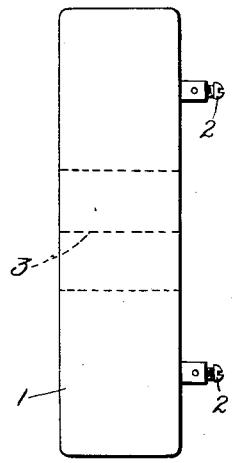

P. THOMAS.
CONDENSER AND METHOD OF MAKING THE SAME.
APPLICATION FILED MAR. 7, 1919.

1,354,147. Patented Sept. 28, 1920.

WITNESSES:
J. A. Helsel.
O. E. Bee.

INVENTOR
Phillips Thomas.
BY
Wesley G. Carr
ATTORNEY

UNITED STATES PATENT OFFICE.

PHILLIPS THOMAS, OF EDGEWOOD, PENNSYLVANIA, ASSIGNOR TO WESTINGHOUSE ELECTRIC & MANUFACTURING COMPANY, A CORPORATION OF PENNSYLVANIA.

CONDENSER AND METHOD OF MAKING THE SAME.

1,354,147.   Specification of Letters Patent.   Patented Sept. 28, 1920.

Application filed March 7, 1919. Serial No. 281,161.

*To all whom it may concern:*

Be it known that I, PHILLIPS THOMAS, a citizen of the United States, and a resident of Edgewood, in the county of Allegheny and State of Pennsylvania, have invented a new and useful Improvement in Condensers and Methods of Making the Same, of which the following is a specification.

My invention relates to condensers and it has, for its primary object, the provision of a method by which condensers for high-voltage and relatively low-capacity duty may be constructed.

One object of my invention is to construct condensers, comprising a plurality of condenser units inclosed in a single casing, which shall possess higher capacities, for the same line voltage, than ordinary condensers.

Another object of my invention is to construct condensers in which excessive heating, caused by corona which obtains with high voltages, may be avoided.

Still another object of my invention is the construction of condensers comprising a plurality of condenser units having a common dielectric and which may be constructed with less material than ordinary condensers of the same capacity.

With these and other objects in view, my invention will be more fully described, illustrated in the drawings, in the several views of which corresponding numerals indicate like parts, and then particularly pointed out in the claims.

Figure 1:
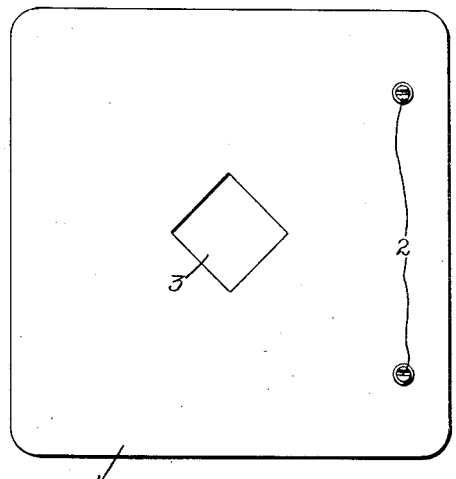
Figure 4:
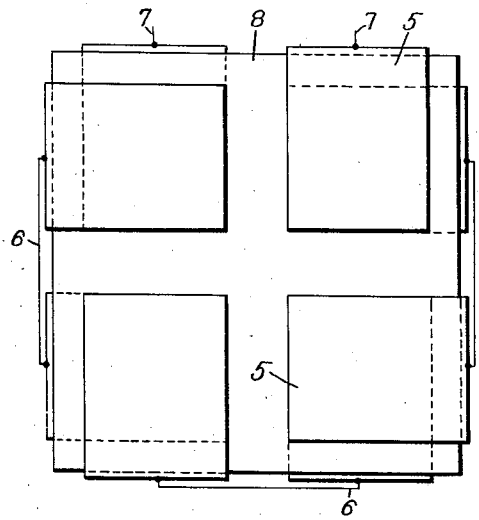
Figure 3:
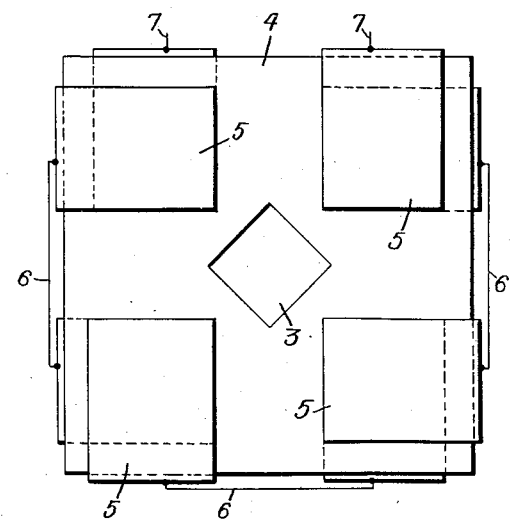

In the drawings, Figure 1 is a plan view of a condenser constructed in accordance with my invention; Fig. 2 is a side view of the condenser shown in Fig. 1; Fig. 3 is a plan view of a quantity of sheet material assembled to provide a condenser in accordance with my invention, and Fig. 4 is a plan view of assembled material, similar to Fig. 3, and illustrating a modification of my invention.

It is well known that the capacity of a condenser is limited not only by the area of conducting material embodied in it but also by the insulating material; that is, higher voltages may not be employed than the strength of the dielectric will permit. The broad object of my invention is to construct a condenser by employing a plurality of condenser units having a common dielectric and by connecting said units in series, whereby the potential difference between the layers of conducting material of each unit may be reduced according to the number of units connected in series. Furthermore, by so connecting a plurality of condenser units and reducing the potential difference between the layers of conducting material, less insulating material is required around the edges and, consequently, a saving of material is realized. Furthermore, by so constructing a condenser, the capacity thereof may be made greater than an ordinary single-unit condenser containing the same amount of conducting material, on account of the reduced thickness of the dielectric and the reduction in the potential difference between the layers of conducting material.

In practising my invention, I may construct a condenser by employing relatively large sheets of dielectric material and disposing, upon each sheet, pieces of conducting material in spaced relation so that a stack of alternate layers of conducting and insulating material may be provided in which each layer of conducting material comprises a plurality of pieces and in which the several layers are separated by sheets of dielectric material, each of which is common to several pieces of conducting material comprising a layer. A stack of such material may then be impregnated with a suitable agent such, for example, as halowax or Montan wax and the body compressed. The condenser units may then be connected in series in any suitable manner and the body disposed in a protective casing. In some instances, it may be desirable to provide the sheets of insulating material or dielectric with central openings to obviate any danger of the condenser being excessively heated at its center or so-called hot spot.

In order to insure a better understanding of my invention I have shown, in Figs. 1 and 2, a condenser 1 having terminals 2 and provided with a central opening 3. The condenser 1, here shown, is the preferred type provided by my invention, and the construction thereof may be better understood by reference to Fig. 3 in which 4 designates a sheet of insulating material which may be any of the best known dielectrics, such for example, as mica or certain varieties of paper. The sheet of insulating material 4 may be interposed between pieces of conducting material 5 which may be disposed, as shown, with their edges projecting from different side of the insulating material 4. Only two layers of conducting material and a single sheet of insulating material have been shown in order to clearly set forth the method of assembling these materials. A stack of such materials of suitable thickness, depending upon the capacity desired in the finished condenser, may be provided while, at the same time, maintaining the relative disposition of the pieces of conducting material and insulating material. By so constructing a condenser, a number of condenser units may be provided which may be connected in series, as indicated at 6, and terminals may be provided for the condenser, as indicated at 7.

A stack of materials, assembled as above described, may then be subjected to a bath of molten wax, such as halo wax or Montan wax, to expel the air from between the layers of material and impregnate the dielectric, in case an absorbent dielectric is employed. The body thus formed may then be subjected to pressure in a cold press to cool the body and to compact the material, after which it may be inclosed in a suitable casing. The casing may be of any desirable material, such as a preformed metal casing or it may be a preformed casing of insulating material possessing sufficient mechanical strength or a casing may be molded directly about the body. I prefer, however, to mold the casing about the body because this provides a compact and satisfactory cover.

In Fig. 4 are shown materials assembled in exactly the manner shown in Fig. 3, the only difference being that the sheet of insulating material 8, in this instance, is not provided with a central opening. The central opening is not necessary in all instances but it is desirable as it reduces the danger of excessive heating in the center of the condenser.

It will be apparent from the description of the construction of a condenser embodying my invention, that a voltage applied to the terminals thereof will establish only one-fourth the potential difference between the layers of conducting material that such impressed voltage would establish between the layers of conducting material in an ordinary single-unit condenser. This, therefore, allows a reduction of the thickness of the insulating material employed, in fact the thickness necessary is only one-fourth that of the single-unit condenser for the same impressed voltage. It will be obvious, therefore, when four units are employed, that each unit embodied in my condenser will have four times the capacity of a single-unit condenser for substantially the same area of conducting material. Furthermore, since the potential difference between the conducting plates is greatly reduced, danger of corona and excessive heating is avoided.

Although I have specifically described a condenser embodying my invention, comprising four condenser units inclosed in a suitable casing, it will be obvious that condensers may be constructed in a similar manner of a greater or less number of condenser units which may be embodied in a single casing. In view of this, I desire that no limitations shall be imposed except such as are indicated in the appended claims.

I claim as my invention:

1. A condenser comprising a plurality of condenser units having a common dielectric provided with a central opening and connected in series and a casing therefor.

2. A condenser comprising relatively large sheets of insulating material, provided with central openings, each being interposed between a plurality of comparatively small sheets of conducting material disposed in spaced relation and a casing molded about the stacked material.

3. A condenser comprising a plurality of stacks of conducting material disposed in spaced relation with the corresponding layers of conducting material of each stack connected together and with the stacks connected in series, sheets of insulating material provided with central openings interposed between the layers of conducting material, each sheet being common to all of the stacks of conducting material and a casing molded about the material.

4. A method of making condensers that comprises forming a stack of alternate layers of conducting and insulating material by employing relatively large sheets of insulating material provided with central openings and disposing upon each sheet pieces of conducting material in spaced relation so that each layer of conducting material has a common dielectric, impregnating the body thus formed, connecting the pieces of conducting material of each layer in series and inclosing the body in a suitable casing.

5. A method of making condensers that comprises stacking alternate layers of conducting material and insulating material provided with central openings to provide a plurality of condenser units having a common dielectric, embedding the assembled body in a suitable wax, connecting the condenser units in series and inclosing the body in a suitable casing.

6. A method of making condensers that comprises stacking alternate layers of conducting material and mica provided with central openings to provide a plurality of condenser units having a common dielectric, embedding the assembled body in a suitable wax, connecting the condenser units in series and molding a casing about the body.

7. The method of making condensers that comprises forming a stack of alternate layers of conducting and insulating material by employing relatively large sheets of insulating material provided with central openings and so disposing a plurality of plates of conducting material upon each of the layers of insulating material that one edge of each of the conducting plates projects beyond the insulating material, impregnating the body thus formed, connecting the pieces of conducting material of each layer in series and inclosing the body in a suitable casing.

In testimony whereof, I have hereunto subscribed my name this 13th day of Feb., 1919.

PHILLIPS THOMAS.